United States Patent [19]

Draxler

[11] 4,252,094
[45] Feb. 24, 1981

[54] ANTI-SYPHON VALVE UNIT FOR MARINE FUEL SUPPLIES APPARATUS

[75] Inventor: James R. Draxler, Fond du Lac, Wis.

[73] Assignee: Brunswick Corporation, Skokie, Ill.

[21] Appl. No.: 898,936

[22] Filed: Apr. 24, 1978

[51] Int. Cl.³ .................. F16K 31/06; F16K 15/18
[52] U.S. Cl. ...................... 123/198 DB; 251/139; 137/495; 137/523
[58] Field of Search ................. 251/139, 141; 137/DIG. 2, 522, 523, 495; 123/198 DB, 139 AZ, 198 B

[56] References Cited

U.S. PATENT DOCUMENTS

| | | | |
|---|---|---|---|
| 2,212,486 | 8/1940 | Zoder | 133/198 DB |
| 3,421,546 | 1/1969 | Jennings et al. | 137/523 |
| 3,810,489 | 5/1974 | MacManus | 137/495 |
| 3,833,015 | 9/1974 | Knever | 251/141 X |

FOREIGN PATENT DOCUMENTS 1106163   7/1955   France ........................ 251/139

Primary Examiner—Arnold Rosenthal
Attorney, Agent, or Firm—Wm. G. Lawler, Jr.; Lewis L. Lloyd

[57] ABSTRACT

A marine propulsion apparatus includes an external combustion engine having a fuel pump connected by an electrically operated anti-syphon valve unit to a storage tank. The electrically operated anti-syphon valve unit includes a resiliently loaded valve means which is moved to open the valve unit either by an electrical operating means or by the normal pressure differential created by operation of the engine fuel pump.

14 Claims, 4 Drawing Figures

3,252,094

ANTI-SYPHON VALVE UNIT FOR MARINE FUEL SUPPLIES APPARATUS

BACKGROUND OF THE INVENTION

This invention relates to an anti-syphon valve for marine fuel supply apparatus and particularly a gasoline supply apparatus in marine propulsion drives.

In one widely used marine propulsion drive, an inboard mounted internal combustion engine is housed within a suitable enclosure within the boat and coupled through the transom to an outboard pendant drive unit. The enclosure not only protects the operating personnel from the operating components and the engine from the external environments, but provides a high degree of sound proofing. A gas tank is built into the boat, either in the side of the boat adjacent the engine or in the forward or bow portion of the boat. A gas line connects the tank to the engine fuel pump. The fuel tank is often located above the level of the fuel pump. The fuel line at the fuel pump is generally a flexible line which may break, or in the event of a minor fire may burn open. The flow from the tank may continue, as a result of syphoning, into the boat bilge. This of course creates an extremely hazardous condition.

In order to prevent the above condition, a spring-loaded check valve is mounted in the gas line between the fuel tank and the engine. The spring-loaded construction requires a selected pressure differential across the check valve before flow starts; for example, 30 inches of fuel. This provides a simple, safe and reliable anti-syphon construction. Such an anti-syphon control is also approved by the United States Coast Guard and thus may be used. However, the pressure differential requirement of the valve promotes creation of a vapor lock under commonly encountered engine operating conditions on warm days and/or warm engine compartments.

Another Coast Guard approved structure includes a solenoid-operated needle-valve having an operating coil connected to the engine's ignition key switch for operation. The valve is normally held closed by a heavy spring such that no fuel can be withdrawn from the tank unless the valve is electrically energized. Such a valve structure must however include a manual override to provide for manually opening the valve. If the operating coil or electrical system should fail or malfunction, the valve closes and shuts down the fuel supply. Such valves avoid the vapor lock problems associated with the simple check valve. However, whereas the cost of a check valve unit may be on the order of three dollars, the cost of a solenoid valve is on the order of fifty dollars.

SUMMARY OF THE PRESENT INVENTION

The present invention is particularly directed to an anti-syphon electrical valve unit for marine propulsion fuel supplies which is low cost, simple and reliable while eliminating vapor lock promotion and maintaining a fuel supply in the presence of an electrical failure or malfunction. The valve unit also includes a fail safe circuit operation. In accordance with the present invention, an electrically operated anti-syphon valve unit includes a resiliently loaded valve means which is moved to open the valve unit either by an electrical operating means or by the normal pressure differential created by operation of the engine fuel pump.

Under normal operation, a coil means or other electrical operator of the anti-syphon valve unit is energized whenever the engine is operated and provides full fuel flow without restriction, thus eliminating the possibility of any vapor-lock conditions caused by the additional vacuum requirement associated with a pressure drop created in the fuel line when employing a spring-loaded ball check valve unit. In the absence of an electrical signal for any reason including electrical failure and the consequent de-energization of the coil means, the valve unit automatically changes to a conventional check ball mode. The new dual functioning valve of this invention thus includes the full-flow advantage of the conventional electrically operated valve as well as the automatic anti-syphon function of the ball check valve thereby eliminating the necessity for manual override.

The invention thus provides a reliable and relatively inexpensive anti-syphon valve unit meeting all of the governmental requirements presently applied to anti-syphon structures.

In a preferred embodiment of the invention, the check valve includes a simple brass tube enclosed at the opposite end by brass cylinders. The inlet cylinder includes a valve seat on the inner end with a spring-loaded check ball. A copper coil is wound around the tube and located downstream of the closed ball position. The coil is located within a suitable encapsulated enclosure for use in marine environment.

The present invention thus provides a low cost reliable anti-syphon valve unit particularly adapted to a marine propulsion engine.

BRIEF DESCRIPTION OF DRAWING

The drawing furnished herewith illustrates a preferred construction of the present invention in which the above advantages and features are clearly disclosed as well as others which will be readily understood from the following description.

In the drawing.

DESCRIPTION OF ILLUSTRATED EMBODIMENTS

Figure 1:
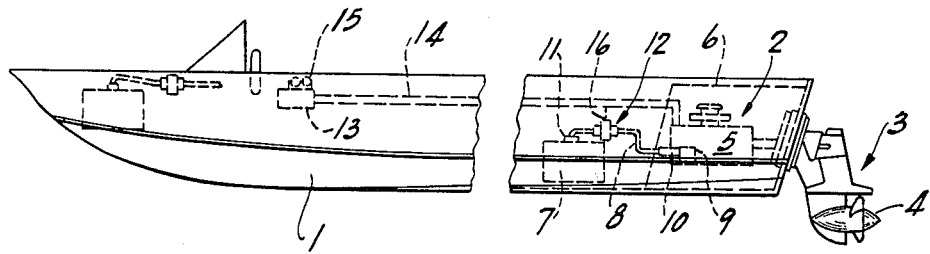
FIG. 1 is an illustration of the mounting of a fuel supply system for an inboard/outboard propulsion drive apparatus with an anti-syphon valve unit connected in the system.

Referring to the drawings and particularly to FIG. 1, a recreational type boat 1 is illustrated with an inboard-outboard propulsion unit 2 secured to the aft end of the boat. Generally, the propulsion unit includes an outboard pendant unit 3 with a propeller 4 rotatively secured to the lower end thereof and interconnected through a suitable drive train to an inboard mounted engine 5. An enclosure 6 is mounted within boat 1 about engine 5 and provides a relatively tight covering for protection and sound deadening of engine noise. A fuel tank 7 is built into the sidewall of boat 1 and connected by a supply line 8 to the engine fuel pump 9. The supply line 8 is generally a rigid metal tubing connected to the fuel pump by a terminal flexible tubing 10. The fuel tank 7 includes a top wall outlet 11 which is generally located substantially above the level of the fuel pump 9.

An anti-syphon valve unit 12 is connected in line 8 to prevent syphoning of gasoline from tank 7 in the event the line 8 breaks or is otherwise opened. Valve unit 12 is electrically operated and is suitably connected to the boat power supply. In the illustrated embodiment, a single-lever control unit 13 is shown mounted adjacent the forwarding operating station of the boat with a power cable 14 interconnected into the engine start and ignition system. Unit 13 generally includes a key-operated ignition control 15 for starting of the engine. As diagrammatically illustrated, the valve unit 12 includes a power lead 16 forming a part of cable 14 to receive power whenever ignition control 15 is turned on.

The present invention is particularly directed to the structure of the anti-syphon valve unit 12 which may be applied to a fuel supply for any internal combustion engine and particularly for marine propulsion drives.

Figure 2:
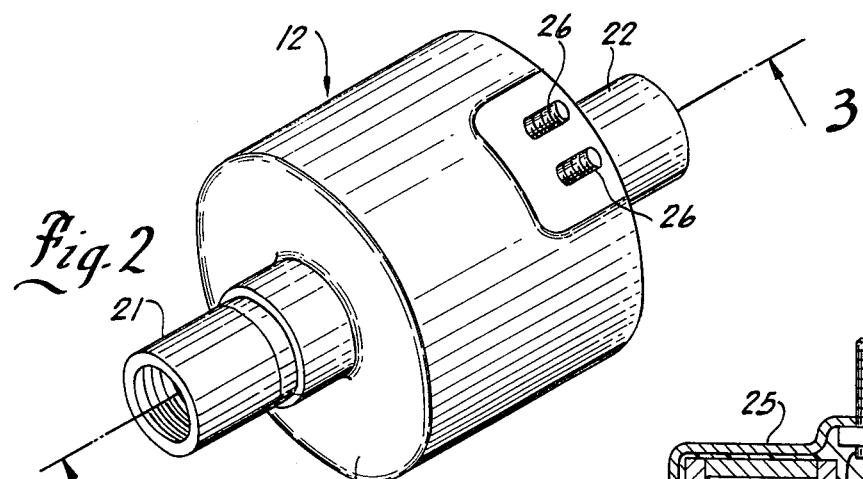
FIG. 2 is a pictorial view of the anti-syphon valve unit.
Figure 4:
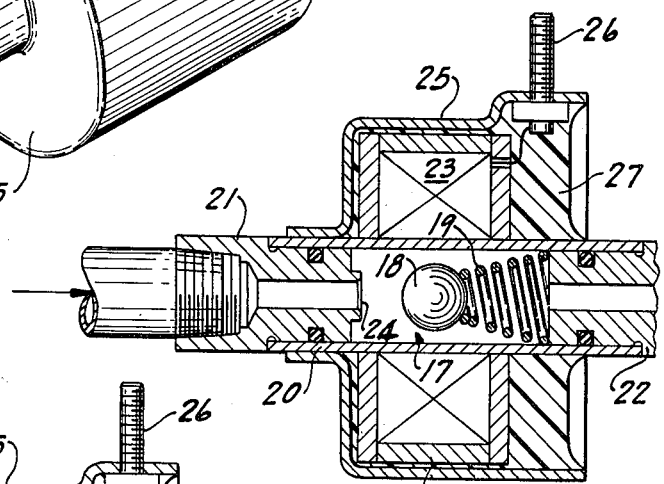
FIG. 4 is a fragmentary view of the valve unit as shown in FIG. 3 with a full flow position thereof.
Figure 3:
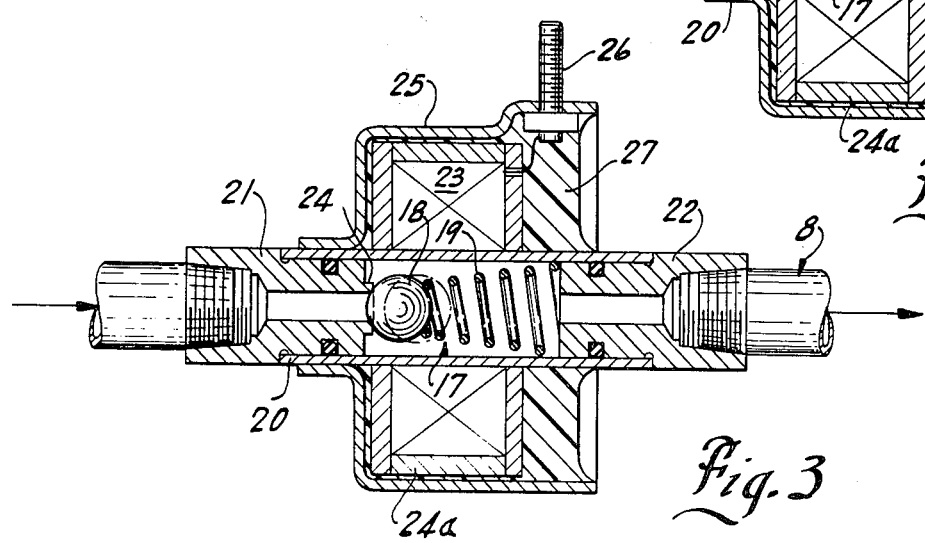
FIG. 3 is an enlarged vertical section of the valve unit.

Referring particularly to FIGS. 2 and 3, the valve unit 12 includes a spring-loaded check valve section 17 connected in series in the flow line 8. The valve section 17 includes a check ball 18 urged by a spring 19 to a full closed position. The check valve section 17 is responsive to the pressure differential generated by the fuel pump means 9, and in particular the vacuum created in the downstream side of the line 8 as a result of the operation of the fuel pump, to move the check ball 18 against the force of spring 19 and open the check valve unit 12 to supply gasoline to the fuel pump 9. Further, an encircling coil unit 23 is located about the check valve section 17 and connected to the power line 16 for selective energization. When the coil unit 23 is energized, the check ball 18 is electromagnetically moved to a full flow position, as shown in FIG. 4, to provide fuel to the engine.

More particularly, in the illustrated embodiment, the valve section 17 includes a tubular pipe 20 formed of brass or other similar non-magnetic material. The opposite ends of pipe 20 are closed by similar internally threaded tubular end caps or connectors 21 and 22 of brass or the like and each of which is a similar cylinder member sealed within the opposite ends of the brass tube. The check ball 18 and spring 19 are located within the tube between the connectors 21 and 22. Connector 21 has a small inwardly projecting seat 24 and spring 19 urges the ball into engagement therewith.

Coil 23 is wound within a suitable annular magnetic frame 24a and close fitted over the tube 20. The coil is preferably located immediately behind the seated ball 18 as shown in FIG. 3, and when energized, creates a magnetic field which draws the ball 18 toward and to the center of the coil. The length of the coil 23 is, in the illustrated embodiment, such that with the ball 18 centered therein, as shown in FIG. 4, a full flow condition is created; that is, there is essentially no pressure drop across the valve unit 12.

An outer cup-shaped enclosure or housing 25 is located encircling the frame 24 and includes a tubular portion close fitted to the tube 20. The open end extends outwardly of the coil 23 and is provided with power terminals 26 connected to the winding or coil 23 and receiving the incoming power lead or line 16 for selective energization of coil 23. The housing 25 is preferably filled with a suitable potting material 27.

In operation, the anti-syphon valve unit 12 is energized whenever the engine 5 is operated. The check-ball 18 is positively held in the full open position of FIG. 4. This provides full fuel flow without restriction thus eliminating the possibility of any vapor-like conditions such as that caused by the additional vacuum requirement associated with a pressure drop crea6ted in the fuel line 8 when employing a spring-loaded ball check valve unit. In the absence of the electrical signal, for any reason including electrical failure, and the consequent de-energization of the coil 23, the valve unit 12 automatically changes to a conventional check ball mode of operation. Thus, the pressure differential created by the operation of the fuel pump 9 hydraulically moves the check ball 18 to a partially open position shown in FIG. 3. Although a pressure drop is now present with the conventional vapor lock problems, the valve unit 12 continues to function to prevent syphoning of fuel from the tank 7 should a fuel line break. Further, because valve unit 12 continues to operate and protect against syphoning without electrical input, the usual requirement of a manual override such as required of other electrically operated solenoid fuel valves should not be necessary.

The storage fuel tank 7 may of course be located in the forward part of the boat as also shown in FIG. 1, and similarly connected to the engine fuel pump means. These and similar changes to the system as well as to the particular structure of the new valve unit can be readily provided by those skilled in the art.

The new dual functioning valve of this invention thus includes the full-flow advantage of the conventional electrically operated anti-syphon valve as well as the automatic anti-syphon function of the check valve thereby eliminating the necessity for manual override.

Various modes of carrying out the invention are contemplated as being within the scope of the following claims, particularly pointing out and distinctly claiming the subject matter which is regarded as the invention.

I claim:

1. In a propulsion fuel supply system for supplying fuel from a storage means to an engine through a fuel line means in response to operation of a fuel pump means, said fuel pump means establishing a selected operating pressure differential in said line means, the improvement in an anti-syphon valve unit adapted to be connected in said fuel line means, comprising valve seat means and a resiliently loaded check valve means having resilient closing means urging the check valve means into closing engagement with the valve seat mean and having a closing force less than said pressure differential generated by the fuel pump means to hydraulically establish flow from the storage means in response to operation of the fuel pump means, and an electrically actuated control means coupled to said valve means and operable to positively open said valve means, whereby said fuel pump means is operable to supply fuel through said fuel line means with said control means actuated and with said control means not actuated, said valve means includes a check ball and a spring means urging said ball to a closed position, said fuel pump generating subatmospheric pressure downstream of said valve unit to overcome said spring means and partially open said valve unit, and said control means establishing a force field coupled to said ball and operable to move said ball against the force of the spring means to a full open position.

2. In the fuel supply system of claim 1 wherein said valve means includes a tubular body with an inlet connector connected to said fuel storage means and an outlet connector connected to the inlet of said fuel pump, a valve seat in said inlet connector, said check ball mounted downstream of said valve seat, said spring means including a coil spring located between the check ball and the outlet connector and urging said check ball into sealing engagement with said valve seat.

3. In the fuel supply system of claim 2 wherein said spring is stressed to establish a pressure drop of approximately one and one quarter pounds per square inch in response to the operation of said fuel pump, and said control means includes a coil means encircling said tubular body and establishing an electromagnetic field operable to move said check ball from said valve seat and establish flow with an essentially free flow through said valve unit with substantially less than a pressure drop of one and one quarter pounds.

4. In the fuel supply system of claim 2 wherein said tubular body includes a non-magnetic brass tube, said valve outlet is a brass cylinder sealed within said valve tube, said metal cylinder having a central passageway with an outer threaded portion, said valve inlet is a second brass cylinder sealed within the second end of the tube terminating in spaced relation to said first brass cyclinder, said second cylinder having a circular valve seat of substantially smaller diameter than said tube, said check ball being a magnetic ball of a diameter greater than said circular valve seat and less than said tube, and said coil spring located between said first cylinder and said ball.

5. The fuel supply system of claim 2 wherein said control means includes a coil means encircling said tube downstream of the valve seat and closing position of the ball and establishing a magnetic field moving said ball into the center of said winding.

6. The fuel supply system of claim 5 including an outer cup-shaped housing encircling said winding and having a base portion connected to said tube, and a potting plastic filling said housing.

7. A fuel supply system for a propulsion engine having an electrical power supply and a fuel pump for generating a subatmospheric pressure at a fuel pump inlet, comprising a fuel tank having an outlet, a fuel line connected to said fuel tank outlet, a check valve unit mounted within said fuel line, said check valve unit including a valve seat and a valve member located downstream of said valve seat and a resilient means urging said valve member upstream into closed seated engagement with said valve seat, said valve member and said resilient means being responsive to a fuel pump generated subatmospheric pressure downstream of said valve unit and acting directly on said downstream side on said valve member to move the valve downstream and to the pressure in said fuel tank acting on the opposite side of the valve member to overcome said resilient means and move said valve member downstream of said valve seat and thereby partially open said valve unit, an electromagnetic operator coupled to said valve member and operable to move said valve member to a fully open position independently of said subatmospheric pressure for establishing a full unrestricted fuel flow, and means for connecting said operator into the electrical power supply for the engine whereby said fuel pump means is operable to supply fuel through said fuel line with an unrestricted flow with the operator energized and with a pressure responsive restricted flow with the operator de-energized.

8. The system of claim 7 wherein said outlet of the fuel tank is mounted on the top of the tank, said fuel tank being located with the outlet above said fuel inlet.

9. A fuel supply system for a marine propulsion engine having an electrical power supply and a fuel pump for generating a subatmospheric pressure at a fuel pump inlet, comprising a fuel tank having an outlet, a fuel line connected to said fuel tank outlet, a check valve unit connected in said fuel line, said check valve unit including a spring means urging said valve unit closed and responsive to a fuel pump generated subatmospheric pressure downstream of said valve unit to overcome said spring means and partially open said valve unit, an electromagnetic operator coupled to said valve unit and operable to move said valve unit to a fully open position, and means for connecting said operator into the electrical power supply for the engine, said outlet of the fuel tank is mounted on the top of the tank, said fuel tank being located with the outlet above said fuel inlet, said check valve unit includes in-line passageway and a check ball therein and said spring means holds said check ball against a valve seat in said passageway, said ball including a magnetically responsive material and interacts with the field established by the operator to overcome said spring means and fully open said valve unit.

10. The fuel supply system of claim 9 wherein said check ball is a magnetic stainless steel ball having a plastic coating.

11. The fuel supply system of claim 9 wherein said operator includes a winding encircling said passageway downstream of the valve seat and the closing position of the check ball and establishing a magnetic field moving said ball into the center of said winding to fully open the valve.

12. In the marine engine drive having an internal combustion engine with an engine driven fuel pump including a fuel inlet, a fuel tank having a top fuel outlet, said fuel tank being located with the outlet above said fuel inlet, a fuel line connected between said fuel inlet and said fuel outlet, a spring-loaded check valve unit having a tubular body with an inlet end connected to said fuel tank outlet and outlet end of said valve unit connected to said inlet of said fuel pump, said check valve unit including a valve seat in said inlet end and a check ball mounted downstream of said valve seat with a spring located to urge said ball check into sealing engagement with said valve seat, said spring being stressed to establish a pressure drop of one and one quarter pounds per square inch in response to the operation of said fuel pump, and a coil means encircling said tubular body and establishing an electromagnetic field operable to move said check ball from said valve seat and establish flow with an essentially free flow through said valve unit with substantially less than a pressure drop of one and one-half pounds, and power control means connected to said coil means.

13. In the marine engine drive of claim 12 wherein said tubular body includes a non-magnetic brass tube, said valve outlet is a cylinder sealed in one end of said valve tube, said cylinder having a central passageway with an outer threaded portion, said valve inlet is a second cylinder sealed in the second end of the tube and terminating in spaced relation to said first cylinder, said second cylinder having a passageway with a circular valve seat of substantially smaller diameter than said tube on the innermost end, said check ball being a magnetic ball of a diameter greater than said circular valve seat and less than said tube, said coil spring located between said first cylinder and said ball, said coil means including a winding encircling said tube downstream of the valve seat and the closed valve position of the ball and establishing a magnetic field moving said ball into the center of said winding.

14. In the marine engine drive of claim 13 including an outer cup-shaped housing encircling said winding and having a base portion connected to said tube, and a potting plastic filling said housing.

* * * * *